A. VOGT.
SIGNALING DEVICE FOR AUTOMOBILES AND THE LIKE.
APPLICATION FILED MAR. 29, 1909.
1,030,214. Patented June 18, 1912.
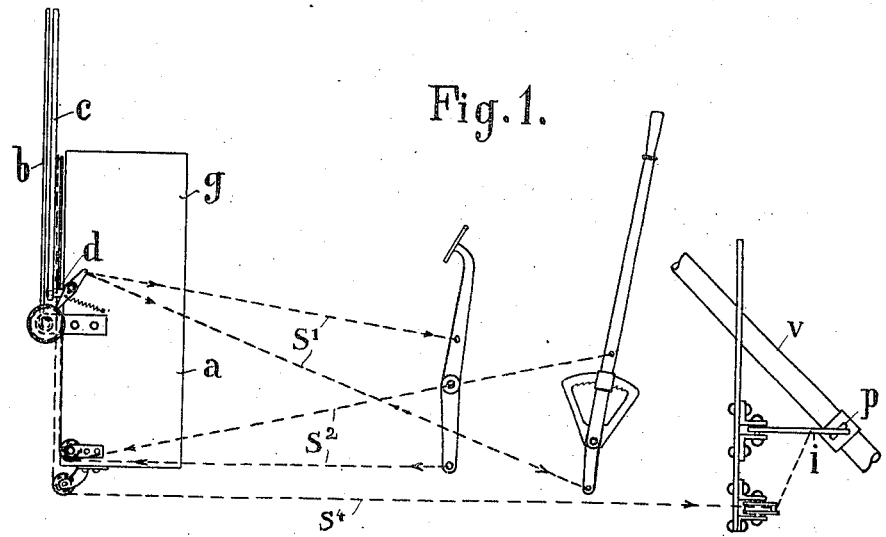
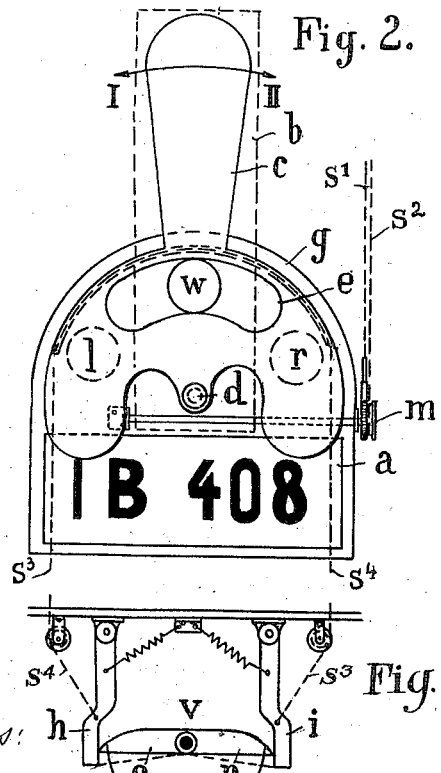
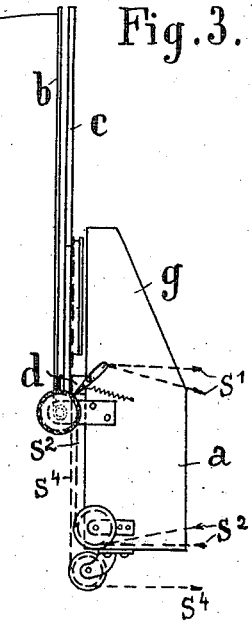

UNITED STATES PATENT OFFICE.

ALEXANDER VOGT, OF WILMERSDORF, GERMANY.

SIGNALING DEVICE FOR AUTOMOBILES AND THE LIKE.

1,030,214. Specification of Letters Patent. Patented June 18, 1912.

Application filed March 29, 1909. Serial No. 486,533.

*To all whom it may concern:*

Be it known that I, ALEXANDER VOGT, a citizen of the Empire of Germany, residing at Wilmersdorf, Berlin, in the Empire of Germany, have invented a new and useful Signaling Device for Automobiles and the Like, of which the following is a specification.

My invention consists of a signaling device, which at the same time is adapted to indicate any sudden stoppage of vehicles, more particularly automobiles, to the following driver.

The essential feature of the new device consists in that the very same signal-arm shall announce not only the deviation from the direction of drive hitherto taken, but also the sudden stoppage, three different positions being assumed for the signal-arm, viz., one for the deviation to the left, another for the deviation to the right, and the third for the stoppage.

The signaling device is operated on the angle of deviation exceeding a certain previously adjusted amount, so that the signal-arm is automatically shifted to the corresponding extreme position, independently of the amount of the deviation. The signaling device is preferably connected with the device for illuminating the number of the vehicle, so that after dark the three different positions of the signaling device can be indicated by differently colored signals.

There are known arrangements, it is true, in which the signaling device is connected with a braking lever, but my new signaling device differs therefrom in that on the braking lever being actuated a flap covering the signaling device is shifted aside for showing the signal-arm, which remains in its normal position. The chief difference between my signaling device and the said known devices resides in the fact, that the very same signal-arm simultaneously gives the various informations, as regards the deviation from the direction of drive hitherto taken, and also as regards the braking. Thereby the essential advantage is obtained, that the following driver need direct his attention only to a single point. There are also known devices, in which any change of the position of the steering vehicle wheels causes the change of lanterns, a certain play being left for the functions of the several parts. My arrangement differs from such devices in that the signaling device is operated on the steering wheel being operated and automatically shifts its signal-arm to the respective extreme position, so that the signal is given to the following driver in an absolutely unmistakable manner without any regard to the amount of the deviation from the direction of drive. The principle of my invention is therefore characterized by the connection between the signal-arm and the steering wheel and the brake, the feature being, that the signal-arm or a covering flap is simply released whereupon it automatically shifts to the respective extreme position. The signaling device is in a mode of execution illustrated in the accompanying drawing, in which—

Figure 1 is a side elevation of the signaling means and operating devices therefor with a system of connecting cords, shown diagrammatically. Fig. 2 is an elevation of the same. Fig. 2$^a$ is a plan view of the operating mechanism. Fig. 3 is a side elevation of the device shown in Fig. 2.

Similar letters of reference refer to similar parts in all the views.

$a$ denotes the number plate which is preferably put on the rear side of the vehicle as usual. The box carrying the number plate comprises in its upper portion an extended semicircular illuminating space $g$. This illuminating space is on the front covered by a plate with three glass-disks $l$, $w$ and $r$, of which the disk $l$ is lilac-colored, the disk $w$ is white and the disk $r$ is red. In front of these three colored glass-disks is the signal-arm $c$ which is fulcrumed at $d$. In the middle position of the signal-arm $c$ its cut $e$ uncovers the white glass-disk $w$. If it is turned into its left extreme position, both the lilac-colored and the white disks $l$ and $w$ will be visible in the cut $e$. If the signal-arm $c$ is turned into its right extreme position, both the red and the white disks $r$ and $w$ will be visible. When the signal-arm $c$ occupies its middle position, it is normally hidden by a covering flap $b$ which also covers the white glass-disk $w$. For the signal "stop" the covering flap $b$ is turned to the front downward into a horizontal position and thus uncovers both the colored signal-arm $c$ and the white glass-disk $w$. For the signal "drive to the left" or "drive to the right" respectively the signal-arm $c$ is turned downward in the respective direction indicated by an arrow. If the vehicle is at the same time braked, the covering flap $b$ is turned downward, so that the following driver is informed not only of the deviation from the direction of drive, but also of the simultaneous braking.

The connection of the signal-arm and the covering flap with the steering gear and the braking device can be effected in any known manner, for example by means of wires $s^1$, $s^2$, $s^3$, $s^4$ of which two lead to the steering device and the other two to the braking device. The covering flap $b$ is turned downward in the manner, that on actuating the steering device one wire $s^1$ releases a stop, whereupon the covering flap turns into its horizontal position, while on turning back the braking device $s^2$ by means of a pulley $m$ returns the flap $b$ upward to its normal position. The wires $s^3$ and $s^4$ lead to the steering device. The steering shaft $v$ carries two arms $o$ and $p$. The arm $o$ normally holds a bell-crank lever $h$ which actuates the wire $s^3$ on the steering shaft being turned in the direction of the arrow 1, while the lever $i$ is actuated by the arm $p$ on the steering shaft $v$, it being released, if the shaft $v$ is turned in the direction of the arrow 2. The arms $o$ and $p$ as well as the levers $h$ and $i$ are so proportioned, that the steering shaft $v$ is permitted to turn through an angle not larger that 10° without actuating the signal-arm $c$. If, however, this limit is exceeded, the arm $h$ or $i$ will be released by the arm $o$ or $p$, when the signal-arm $c$ will at once shift into its extreme position. In a similar manner on actuating the braking device the wire $s^1$ will release the covering flap $b$, which therefore turns into its horizontal position, while it is slowly turned upward on turning back the braking handle.

The word or term "abreast" is used in the claims in its accepted meaning as indicating that one part moves alongside of another part.

I claim:

1. A signaling device for vehicles provided with steering and brake operating mechanism comprising in combination, different colored signaling elements, means movable alongside of said elements to conceal one or a plurality thereof or expose one in combination with another thereof, a movable member for concealing or exposing one of said elements irrespective of the position of said means, and devices connecting said means and said member for operation by said steering and brake operating mechanism.

2. A signaling device for vehicles comprising in combination, different colored signaling elements, means movable alongside of said elements to conceal one or a plurality thereof or to expose one in combination with another thereof, a movable member for concealing or exposing one of said elements irrespective of the position of said means, and devices for operating said means and said member.

3. A signaling device for vehicles provided with steering and brake operating mechanisms, comprising in combination, different colored signaling elements, means movable alongside of said elements to conceal one or a plurality thereof or expose one in combination with another thereof and operated by said steering mechanism to indicate deviation of the vehicle from a straight course, and a movable member operated by said brake mechanism for concealing or exposing one of said elements irrespective of the position of said means.

4. A signaling device for vehicles provided with steering and brake operating mechanisms, comprising in combination, a plurality of signaling elements, means movable alongside of said elements in one plane to conceal one or a plurality thereof or expose one in combination with another thereof, a member movable in another plane for concealing or exposing one of said elements irrespective of the position of said means, and connections whereby said means and said member are operated by said mechanisms.

5. A signaling device comprising in combination, a plurality of signaling elements, a signal arm movable alongside of said elements to expose or conceal certain thereof, and a member for concealing or exposing at least one of said elements and said arm.

6. A signaling device comprising in combination, a plurality of signaling elements, a signal arm provided with a slot and movable alongside of said elements to conceal one or a plurality thereof or expose one in combination with another thereof, and a second member movable toward and away from said arm and in a different plane for concealing or exposing, respectively, said arm and one of said elements.

7. A signaling device comprising in combination, a plurality of signaling elements, a signal arm pivoted to move alongside of said elements to expose or conceal certain thereof, and a member pivoted to swing at right angles to the path of movement of said arm for exposing or concealing one of said elements.

8. A signaling device for vehicles provided with steering and brake operating mechanisms comprising in combination, a plurality of signaling elements, a signal arm operated by said steering mechanism for exposing or concealing certain thereof, a member for concealing or exposing one of said elements and said arm, a connection between said member and brake mechanism for moving the former into a concealing position, and a device operated by said brake mechanism for releasing said arm into an exposing position.

ALEXANDER VOGT.

Witnesses:
 WOLDEMAR HAUPT,
 HENRY HASPER.